Oct. 20, 1925.
C. J. WEBER
VEHICLE
Filed July 24, 1922
1,557,749
3 Sheets-Sheet 2
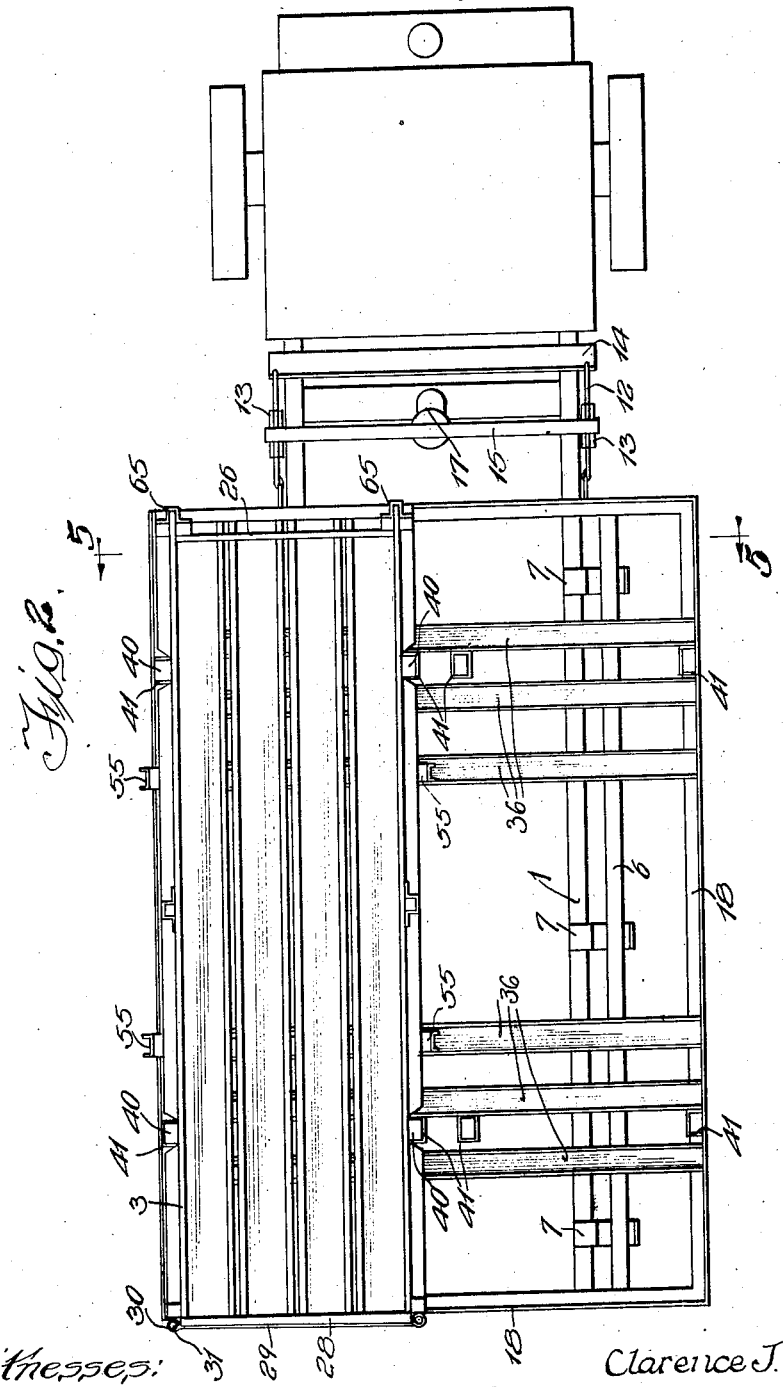
Witnesses:
W. F. Kilroy
J Harry R. G. White
Inventor:
Clarence J. Weber
Brown Boettcher Dinner
By
Attys Oct. 20, 1925.

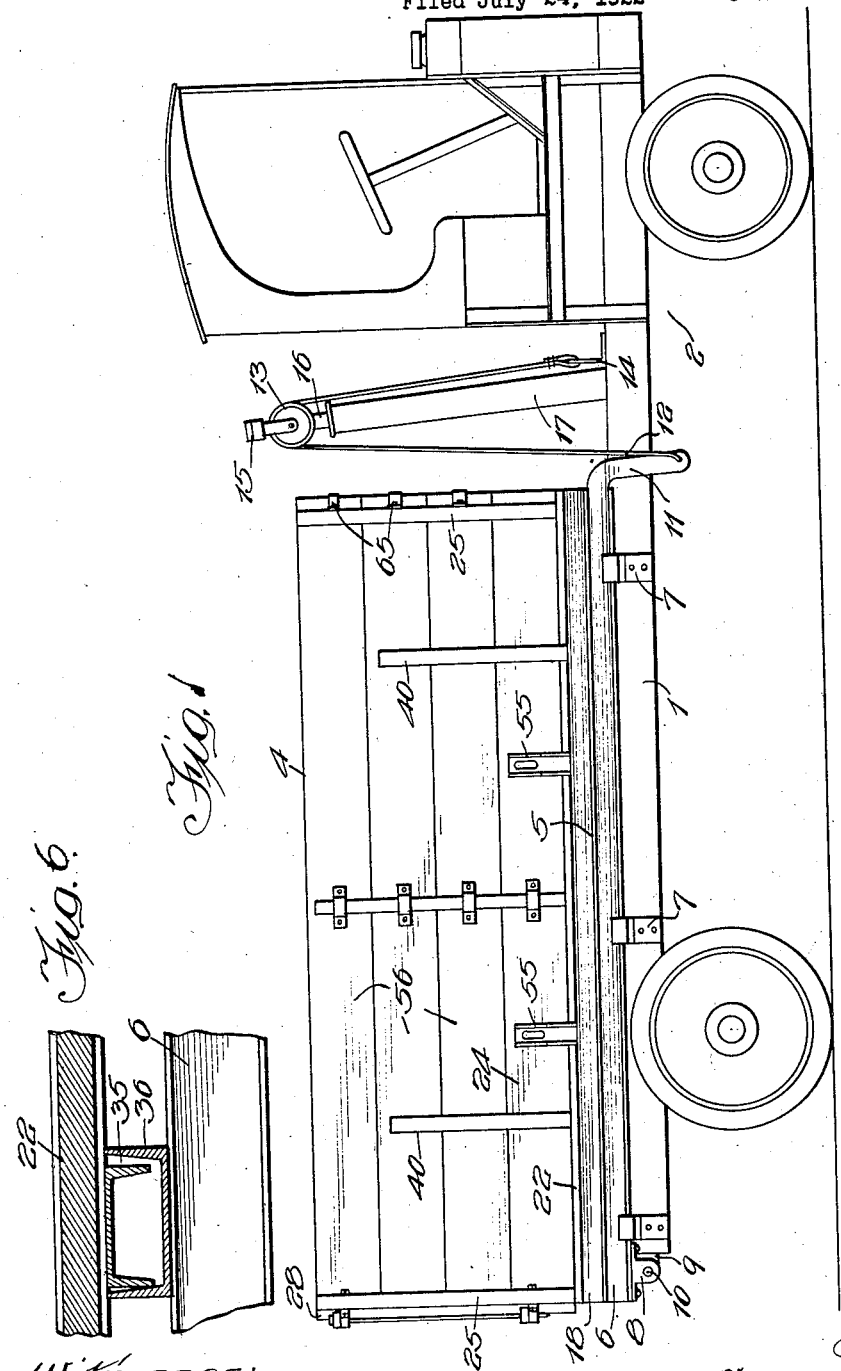

C. J. WEBER 1,557,749

VEHICLE

Filed July 24, 1922     3 Sheets-Sheet 3

Patented Oct. 20, 1925.

1,557,749

UNITED STATES PATENT OFFICE.

CLARENCE J. WEBER, OF CHICAGO, ILLINOIS, ASSIGNOR TO NATIONAL BRICK CO., OF CHICAGO, ILLINOIS, A CORPORATION OF ILLINOIS.

VEHICLE.

Application filed July 24, 1922. Serial No. 577,023.

*To all whom it may concern:*

Be it known that I, CLARENCE J. WEBER, a citizen of the United States, residing at Chicago, in the county of Cook and State of Illinois, have invented a certain new and useful Improvement in Vehicles, of which the following is a full, clear, concise, and exact description, reference being had to the accompanying drawings, forming a part of this specification.

This invention relates to vehicles and its objects are to facilitate and expedite loading the vehicle and transporting the load therewith and to provide a generally improved and simplified body construction and mounting to that end.

The invention is illustrated in the accompanying drawings in which;—

Figure 1 is a side elevational view of a truck embodying my invention;

Fig. 2 is a top plan view of the same;

Fig. 3 is a rear end view of the truck body;

Fig. 4 is a longitudinal sectional view taken on the line 4—4 of Fig. 3;

Fig. 5 is a transverse sectional view taken on the line 5—5 of Fig. 2; and

Fig. 6 is an enlarged detail section showing the means for securing the boxes making up the truck body, against longitudinal displacement on the tiltable sub-frame.

Referring to the drawings: 1 designates the chassis of the particular truck 2 which I have elected to illustrate. The body provided for carrying out my invention comprises in this particular instance a pair of longitudinal box portions 3 and 4 removably supported on a sub-frame 5.

The sub-frame 5 comprises a generally rectangular frame 18 mounted upon a pair of longitudinal I-beams 6, which I-beams are supported upon the laterally projecting arms of bracket members 7. The bracket members 7 are mounted in suitable spaced order along the longitudinal channels of the chassis 1 as shown in Figs. 1 and 5. The rear ends of the I-beams 6 carry bearing members 8 having openings for registration with openings in bearing members 9 secured to the rear end of the chassis 1 and a common shaft 10 extends transversely through the registering openings of the several bearings members and thereby pivotally mounts the rear end of the sub-frame upon the vehicle chassis.

The front ends of the I-beams 6 are preferably bent down as shown at 11. Suitable flexible elements such as the cables 12 are fastened to the lower ends of the bent down portions 11 of the I-beams 6 and extend up over sheaves 13 and down to and are fastened at their other ends to a bracket member 14 mounted on the truck chassis. The sheaves 13 are suspended from the opposite ends of a cross beam 15 mounted upon the upper end of a piston member 16 which operates in a lifting cylinder 17 so that when the piston is projected upwardly from the cylinder the front end of the subframe 5 will be lifted up about the shaft 10 at the rear end to tilt the sub-frame and body carried thereby and discharge the load. The details of the dumping gear per se are immaterial in so far as my present invention is concerned and may be varied as desired.

Each of the longitudinal body portions or boxes 3 and 4 comprises a bottom made up of suitable boards 22. The boards 22 are preferably bound with channels 23 to strengthen and impart the desired rigidity thereto. The sides of the removable boxes 3 and 4 are made up of boards, the lower or base board 24 on each side of each box being preferably fixed to the base 22 and to the upright corner posts 25 mounted at the four corners of each box. The upper boards on the opposite sides of each box are removable to permit filling or loading as will be hereinafter apparent. Suitable ends 26 close the front ends of the boxes 3 and 4. U-shaped straps 65 extending around the forward ends of the removable boards 56 and secured at their opposite ends to the ends 26 and posts 25, respectively, firmly bind the front corners of the boxes together.

The rear ends or tail gates 28 of each box are provided with straps 29 arranged across the ends of the box and secured thereto. The opposite ends of the straps 29 are bent back to form eyes 30 for the reception of rods 31 which are inserted through eyes 32 attached to the rear corner posts 25 and through the eyes 30 to secure the ends or gates 28 in place. The lower ends of the rods 31 are preferably pointed as shown, to facilitate their ready removal and insertion. It will now be apparent that by removing the rod 31 at either side of the tail gate, the gate will be free to swing open about the rod at the other side. This permits opening from either side and makes the boxes 3 and 4 interchangeable, that is, upon removal of the boxes, each may be replaced in the position formerly occupied by the other without in any way interfering with the desired opening of the tail gates.

The under surfaces of the bottoms 22 of each of the boxes 3 and 4 is provided with a plurality of inverted channels 35 attached thereto in the particular instance shown in two groups of 3 each. These inverted channels 35 are arranged transversely across the bottom of the boxes 3 and 4 and the depending flanges of the same are adapted for engagement between the upstanding flanges of continuous larger channels 36 mounted transversely across the angle iron frame 18 of the sub-frame 5. The boxes 3 and 4 are thereby securely held against longitudinal displacement especially upon tilting the forward end of the body up to dump or discharge the load out through the rear ends, the tail gates 28 being swung open to permit such dumping or discharge. The channels 35 are preferably smaller than the channels 36 so that a clearance will be provided between the opposite upright flanges of the channels 36 and between the lower ends of the flanges of the channels 35 on the bases of the channels 36 when the channels 35 are in place therein. This facilitates mounting and allows for such like variations as are bound to occur. It should be noted at this point that the channel mounting just described, in addition to maintaining the proper longitudinal positioning of the boxes 3 and 4 provides an exceedingly low mounting therefor. This is desirable in maintaining the center of gravity of the load at the lowest possible point.

When in position upon the truck, the boxes 3 and 4 are held against transverse displacement by upright posts or stakes 40, the lower ends of which are mounted in socket members 41. The socket members for the stakes at the outer sides of the respective boxes are attached to the inner sides of the longitudinal portions of the angle iron frame 18. The socket members for the stakes at the inner sides of the boxes are attached to the transverse channels 36 between the opposite ends thereof as shown in Fig. 2.

In loading, the boxes are lifted or removed from the stop-frame 18 and placed adjacent the bricks or other load to be placed therein. Then the upper boards 56 of the side of the box adjacent the kiln of bricks or other material having been removed, the bricks, for example, may be filled directly into the box from their position in the stack or kiln.

Upon filling the boxes, the removable boards thereof may be replaced, and the boxes then re-positioned upon the truck.

Upon replacing both of the boxes with the channels 35 thereof in proper engagement with the channels 36, the stakes 40 are inserted into the socket members 41 and the loaded boxes transported to the desired "job" or place of discharge. To dump or discharge the bricks, the desired rods 31 are removed and the dumping gear is then operated to lift the front end of the sub-frame 5 up about the shaft 10 and thereby discharge the bricks out through the rear ends of the boxes, the tail gates swinging open about the rods 31 left in place to permit such discharge.

I have found from use that with the truck of my invention, the loading and transportation of bricks is materially facilitated. The time, labor and expense involved is decreased by removing the truck body, positioning the same immediately adjacent the bricks to be loaded so that the bricks may be filled directly into the box from their position in the kiln with the least effort and then replacing the loaded body upon the truck.

Furthermore, the number of loading or filling operations that may take place at the same time is materially increased because the boxes or truck bodies may be positioned at enumerable, vertical and horizontal positions about the kiln and are not limited to positioning about the ground space immediately adjacent the kiln.

The number of handlings of the bricks is decreased and the rate of loading and transportation in a given time and with a given amount of labor is increased, all of which means a lower ultimate cost to the builder.

I do not intend to be limited to the precise details shown and described. It will be apparent, for example, that the truck body may be made up of more than two removable moxes or may comprise a single body portion which is removed, loaded and then replaced upon the truck in a loaded condition.

The subframe may be arranged upon a trailer for attachment to the truck as shown diagrammatically in Figure 1, instead of directly upon the truck frame as shown in Figures 2 to 7. While the cooperating channels on the bottom of the body portions and top of the body carrying frame are preferable for securing the body portions against longitudinal displacement, other means such as the I beams 75 (Fig. 1) may be employed within the scope of my invention. The invention may be employed for loading and transporting other materials than brick.

I claim:

1. In a vehicle of the class described, the combination of a frame, a plurality of separately removable compartments mounted upon said frame, each of said compartments extending longitudinally of the frame from the front to the rear thereof, means between the frame and the bottom of the compartments for holding the compartments against longitudinal movement, and removable stake means along opposite sides of the frame and longitudinally along the intermediate portion of the frame for cooperation with the opposite longitudinal sides of the compartments for holding same in place.

2. In combination, a frame including longitudinal side angle members with inwardly extending base flanges, a plurality of channels spanning said flanges and mounted at opposite ends thereon, a plurality of separately removable compartments mounted upon said frame with their greatest dimensions longitudinally thereof and transverse channel members on the bottom of said compartments for cooperation with said first channels to hold the compartments against longitudinal movement.

3. In combination, a frame including longitudinal side angle members with inwardly extending base flanges, a plurality of channels spanning said flanges and mounted at opposite ends thereon, a plurality of separately removable compartments mounted upon said frame with their greatest dimensions longitudinally thereof, transverse channel members on the bottom of said compartments for cooperation with said first channels to hold the compartments against longitudinal movement, and removable stake means longitudinally along opposite sides and longitudinally along the intermediate portion of the frame for cooperation with opposite sides of said compartments to hold same in place.

4. In a vehicle of the class described, a frame, a running gear therefor, a sub-frame pivoted on said first frame, a plurality of separately removable compartments mounted upon said sub-frame, said compartments being interchangeable and each extending longitudinally of the sub-frame from front to rear thereof and having a discharge opening at its rear to permit simultaneous discharge of the contents from all of said compartments from their mounted position upon the frame, means between the bottom of the compartments and the sub-frame for holding the compartments against longitudinal movement, removable stake means longitudinally along opposite sides and longitudinally along the intermediate portion of the frame for holding the compartments in place, tail gates for the end openings of the compartments and means at opposite sides of said gates for holding the same closed, both of said means being disengageable to permit opening of the gates and each forming a pivot about which the gate is adapted to swing open when the other is disengaged.

In witness whereof, I hereunto subscribe my name this 18th day of July, 1922.

CLARENCE J. WEBER.